United States Patent
Yano et al.

(10) Patent No.: US 6,926,945 B2
(45) Date of Patent: Aug. 9, 2005

(54) BIAXIALLY ORIENTED LAYERED POLYESTER FILM AND FILM WITH HARD COAT LAYER

(75) Inventors: Shinji Yano, Sagamihara (JP); Koji Kubo, Sagamihara (JP)

(73) Assignee: Teijin Dupont Films Japan Limited, Tokyo (JP)

( * ) Notice: Subject to any disclaimer, the term of this patent is extended or adjusted under 35 U.S.C. 154(b) by 0 days.

(21) Appl. No.: 10/398,615

(22) PCT Filed: Dec. 28, 2001

(86) PCT No.: PCT/JP01/11631

§ 371 (c)(1),
(2), (4) Date: Apr. 7, 2003

(87) PCT Pub. No.: WO03/014202

PCT Pub. Date: Feb. 20, 2003

(65) Prior Publication Data

US 2004/0013892 A1 Jan. 22, 2004

(30) Foreign Application Priority Data

Aug. 7, 2001 (JP) ........................................ 2001-238936

(51) Int. Cl.⁷ .......................... B32B 27/08; B32B 27/16; B32B 27/18; B32B 27/20; B32B 27/36
(52) U.S. Cl. ....................... 428/141; 428/480; 428/482; 428/483; 428/212; 428/217; 428/910; 428/694 SG; 428/695; 525/165; 525/176; 525/175; 524/275; 524/277
(58) Field of Search ................................ 428/480, 483, 428/482, 141, 212, 217, 910, 694 SG, 695; 525/165, 176, 175; 524/275, 277

(56) References Cited

U.S. PATENT DOCUMENTS

| | | | | |
|---|---|---|---|---|
| 4,804,573 A | * | 2/1989 | McCarthy et al. | 428/201 |
| 5,166,242 A | * | 11/1992 | Chu et al. | 524/238 |
| 5,218,032 A | * | 6/1993 | Sharma | 524/379 |
| 5,232,983 A | * | 8/1993 | Frost | 524/763 |
| 5,294,650 A | * | 3/1994 | Sharma | 523/523 |
| 5,302,459 A | * | 4/1994 | Kim et al. | 428/447 |
| 5,658,847 A | * | 8/1997 | Goss et al. | 503/227 |
| 5,771,431 A | * | 6/1998 | Mitsuhata et al. | 399/307 |
| 5,863,641 A | * | 1/1999 | Sakamoto et al. | 428/216 |
| 6,194,061 B1 | * | 2/2001 | Satoh et al. | 428/341 |
| 6,309,707 B1 | * | 10/2001 | Mayer et al. | 427/386 |
| 2004/0076844 A1 | * | 4/2004 | Tojo et al. | 428/480 |
| 2004/0265539 A1 | * | 12/2004 | Hashimoto et al. | 428/141 |
| 2005/0019555 A1 | * | 1/2005 | Yano et al. | 428/328 |

FOREIGN PATENT DOCUMENTS

| | | |
|---|---|---|
| EP | 0 591 055 A2 | 4/1994 |
| EP | 0 592 284 A2 | 4/1994 |
| EP | 0 595 669 A1 | 5/1994 |
| EP | 0744302 | 11/1996 |
| EP | 0 872 338 A1 | 10/1998 |
| EP | 1 000 962 A2 * | 5/2000 |
| EP | 1000962 | 5/2000 |
| JP | 63-37167 A | 2/1988 |
| JP | 63-194948 A | 8/1988 |
| JP | 6-116487 A | 4/1994 |
| JP | 7-156358 A | 6/1995 |
| JP | 7-187999 | 7/1995 |
| JP | 7-80281 B2 | 8/1995 |
| JP | 7-242758 | 9/1995 |
| JP | 7-276593 | 10/1995 |
| JP | 08-011447 * | 1/1996 |
| JP | 09-011427 * | 1/1997 |
| JP | 9-123378 | 5/1997 |
| JP | 10-119215 | 5/1998 |
| JP | 10-119215 A | 5/1998 |
| JP | 10-180968 * | 7/1998 |
| JP | 11-179836 * | 7/1999 |
| JP | 11-286092 | 10/1999 |
| JP | 2000-246855 A | 9/2000 |
| JP | 2001-109388 | 4/2001 |
| JP | 2001-150612 * | 6/2001 |

* cited by examiner

*Primary Examiner*—Vivian Chen
(74) *Attorney, Agent, or Firm*—Sughrue Mion, PLLC

(57) ABSTRACT

There is provided an easily adhesive, biaxially oriented laminated polyester film for optical use which has excellent adhesion, transparency and easy slipperiness. The biaxially oriented laminated film has a coating layer formed on at least one surface of an aromatic polyester film, the coating layer containing either a polyester resin, an acrylic resin and wax or a polyester resin and an acrylic resin having an oxazoline group and an alkylene oxide chain.

24 Claims, No Drawings

BIAXIALLY ORIENTED LAYERED POLYESTER FILM AND FILM WITH HARD COAT LAYER

TECHNICAL FIELD

The present invention relates to a biaxially oriented laminated film and a hard coat laminated film. More specifically, the present invention relates to a biaxially oriented laminated film which has a coating layer comprising a specific composition formed on at least one surface of a polyester film and has excellent adhesion, transparency and easy slipperiness, and to a hard coat laminated film.

BACKGROUND ART

A polyester film, particularly a biaxially oriented polyethylene terephthalate film and a biaxially oriented polyethylene naphthalate film are widely used, due to their excellent mechanical properties, heat resistance and chemical resistance, as raw materials for magnetic tapes, ferromagnetic thin film tapes, photographic films, packaging films, films for electronic parts, electrical insulating films, films for laminating metal plates, films to be stuck on surfaces of glass displays, and protective films for a variety of members.

In recent years, a polyester film is often used for a variety of optical applications. For example, it is used as base films for a prism lens sheet, touch screen and backlight which are members for a liquid crystal display device, a base film for an antireflective film and a base film for an explosion-proof film (used to prevent glass from scattering upon implosion of CRT) for a display. Base films used for such optical applications must have excellent transparency and excellent easy adhesions to a prism lens, a hard coat layer, an adhesive layer and an antireflection layer.

The polyester film generally has poor adhesion to a prism lens or hard coat layer comprising a material other than a polyester, e.g., an acrylic resin, as a main component. To improve the poor adhesion, it is proposed to laminate an easily adhesive layer using a polyester resin, an acrylic resin or an urethane resin on surfaces of the polyester film (refer to JP-A 10-119215 and JP-A 2000-246855). However, easily adhesive layers proposed in these publications may exhibit insufficient adhesions depending on applications. For example, the easily adhesive layers have such a problem that when a polyester film having the easily adhesive layers formed thereon is used as a film for CRT, the film exhibits insufficient adhesion to an adhesive layer on the other side of the film while exhibiting good adhesion to a hard coat layer.

Further, a filler (lubricant) is generally introduced into the polyester film so as to improve slipperiness (easy slipperiness) of the film. However, when the polyester film is used as a base material for optical applications, an amount of filler to be added must be minimized since transparency is required. However, when the amount of the filler to be added is small, the surfaces of the film become flat, so that there arises a problem that the surfaces of the film stick to each other when the film is rolled up so as to make the surfaces of the film contact with each other and the stuck portions may become surface defects of the film when the film is unrolled. Further, since slipperiness between the surfaces of the film is poor, the film is difficult to handle, so that there occurs a problem that scratches are formed on the surfaces of the film during production or processing of the film. These problems are particularly noticeable when a resin having a low glass transition point is used in the easily adhesive layers so as to improve adhesion of the polyester film.

Meanwhile, in recent years, use of the polyester film as a surface protecting material for window glass, a showcase, glasses, a meter, a display and a lamp has been receiving attention. To be used for such a purpose, the polyester film must have excellent surface hardness and abrasion resistance as well as sufficient transparency and antireflectivity.

To satisfy such a requirement, it has been attempted to laminate a hard coat (HC) layer and an antireflection (AR) layer on the polyester film. However, due to lack of adhesion to the polyester film, a satisfactory result is not obtained, yet.

As a method for improving the adhesion of the polyester film, for example, a method in which an aqueous polyester film having a glass transition point of 40 to 85° C. is coated on a base film of a transfer film for in-molding so as to improve adhesion to a medium layer is known (refer to JP-A 7-156358).

However, although the adhesion between the base film in the transfer film for in-molding and the medium layer is improved by the method, adhesion in other applications is often not improved to a sufficiently satisfactory level.

Meanwhile, to obtain an easily slippery polyester film having flat surfaces, it is known to form a coating film comprising a composition containing a polyurethane or acrylic resin and a fatty acid amide or bisamide on surfaces of a polyester film (refer JP-A 63-194948).

However, the publication does not indicate that adhesion is improved by use of the fatty acid amide or bisamide.

Further, it is also known that a laminate having good surface hardness and abrasion resistance is obtained by forming a polyester resin layer on a polyethylene terephthalate layer and then forming a radiation curable layer having specific composition on the polyester resin layer (refer to JP-B 7-80281). However, the laminate lacks general versatility due to use of the special curable layer and is not fully satisfactory in terms of adhesion.

In recent years, due to rapid proliferation of personal computers, demand for an antiglare (antireflection) transparent board for a personal computer display which provides good visibility over a long time, displays images with high hue contrasts, causes little exhaustion on an operator and is not easily scratched when wiped to be cleaned has been increasing, and improvements of the above technologies are desired.

DISCLOSURE OF THE INVENTION

It is an object of the present invention to provide a laminated film which is free from the problems of the prior art and has excellent adhesions to functional layers to be used in a variety of optical applications as well as excellent transparency and easy slipperiness.

It is another object of the present invention to provide a hard coat laminated film which is free from the problems of the prior art, displays images with high hue contrasts, has excellent adhesion, good surface hardness and, in particular, cracking resistance and sufficient transparency and antireflectivity and is suitable particularly for a surface layer of a CRT display for a personal computer.

Other objects and advantages of the present invention will be apparent from the following description.

According to the present invention, firstly, the above objects and advantages of the present invention are achieved by a biaxially oriented laminated polyester film (hereinafter may also be referred to as "first biaxially oriented laminated film") comprising:

(A) an aromatic polyester film, and (B) a coating layer containing a polyester resin, an acrylic resin and wax, said coating layer being laminated on at least one surface of the aromatic polyester film.

The first biaxially oriented laminated film may be used in a light transmission layer of a display.

Secondly, the above objects and advantages of the present invention are achieved by a biaxially oriented laminated polyester film (hereinafter may also be referred to as "second biaxially oriented laminated film") comprising:

(A) an aromatic polyester film, and (B) a coating layer containing a polyester resin and an acrylic resin having an oxazoline group and an alkylene oxide chain, said coating layer being laminated on at least one surface of the aromatic polyester film.

The second biaxially oriented laminated film may be used in a light transmission layer of a display.

According to the present invention, thirdly, the above objects and advantages of the present invention are achieved by a hard coat laminated film comprising the above biaxially oriented laminated polyester film of the present invention and a hard coat layer laminated on the coating layer (B) of the film, the hard coat layer having universal hardness (UC) which satisfies the following relational expression:

$$0.6 \times UC \leq UHF \leq 1.2 \times UC$$

wherein UC is the universal hardness of the hard coat layer, and UHF is universal hardness measured from the coating layer (B) side of the biaxially oriented laminated polyester film.

PREFERRED EMBODIMENTS OF THE INVENTION

Hereinafter, the present invention will be described in detail. Firstly, a first biaxially oriented laminated film will be described.

Aromatic Polyester

An aromatic polyester constituting an aromatic polyester film in the present invention is a substantially linear aromatic polyester synthesized from an aromatic dibasic acid or an ester forming derivative thereof and a diol or an ester forming derivative thereof.

Specific examples of the aromatic polyester include polyethylene terephthalate, polyethylene isophthalate, polybutylene terephthalate, poly(1,4-cyclohexylenedimethyleneterephthalate), and polyethylene-2,6-naphthalene dicarboxylate. The aromatic polyester may be a copolymer of these polymers or a blend of the polymers and a small amount of other resins. Of these, polyethylene terephthalate and polyethylene-2,6-naphthalene dicarboxylate are particularly preferred since they have balanced physical properties such as mechanical properties and optical properties.

These aromatic polyesters may contain an appropriate filler as required. As the filler, those which are conventionally known as lubricants for polyester films can be used. For examples, calcium carbonate, calcium oxide, aluminum oxide, kaolin, silicon oxide, zinc oxide, carbon black, silicon carbide, tin oxide, crosslinked acrylic resin particles, crosslinked polystyrene resin particles, melamine resin particles, crosslinked silicone resin particles and the like can be used.

As the filler, particles as described above which have an average particle diameter of 0.5 to 5 μm are preferably contained in an amount of 0.0001 to 0.1% by weight based on the aromatic polyester. When a film with higher transparency is desired, it is preferred to avoid inclusion of the filler. Further, a colorant, an antistatic agent, an antioxidant, an organic lubricant, a catalyst and the like can also be added to the polyester as required.

Aromatic Polyester Film

An aromatic polyester film (A) in the present invention can be obtained by melt-extruding, for example, the above aromatic polyester into a film, cooling and solidifying the extrudate on a casting drum to obtain an unstretched film, stretching the unstretched film at a temperature of Tg to (Tg+60)° C. in a longitudinal direction once or more to a total stretch ratio of 3 to 6 times, stretching the longitudinally stretched film at a temperature of Tg to (Tg+60)° C. in a transverse direction to a stretch ratio of 3 to 5 times, heat-treating the biaxially stretched film at 180 to 230° C. for 1 to 60 seconds as required, and reheat-treating the film at a temperature lower than the heat treatment temperature by 10 to 20° C. while allowing the film to shrink 0 to 20% in the transverse direction.

The aromatic polyester film (A) preferably has a thickness of 25 to 300 μm. The upper and lower limits of the film thickness are more preferably 250 μm and 50 μm, respectively. When the film thickness is in the above range, the film exhibits favorable strength when used as a hard coat or a substrate for a touch screen, antiglare treatment or the like.

Polyester Resin in Coating Layer (B)

In the present invention, a polyester resin is used as a component which constitutes a coating layer (B). As the polyester resin, a polyester resin having a glass transition point of 50 to 100° C. is preferred. The glass transition point (Tg) is more preferably not higher than 90° C., particularly preferably not lower than 60° C. Further, the polyester resin is preferably a polyester which is soluble or dispersible in water (which may contain a small amount of organic solvents).

Preferable examples of the polyester resin include polyester polymers or copolymers comprising a polybasic acid component and a polyol component such as those shown below. However, components of the polyester resin are not limited to these monomers.

Illustrative examples of the above polybasic acid component include terephthalic acid, isophthalic acid, phthalic acid, phthalic anhydride, 2,6-naphthalenedicarboxylic acid, 1,4-cyclohexanedicarboxylic acid, adipic acid, sebacic acid, trimellitic acid, pyromellitic acid, dimer acid, and 5-sodium sulfoisophthalic acid. It is preferred to form a copolyester by use of two or more of these acid components. Further, an unsaturated polybasic acid component such as maleic acid, itaconic acid and a hydroxycarboxylic acid such as p-hydroxybenzoic acid can be used in a very small amount of, for example, not larger than 5 mol % based on all dicarboxylic acid components.

Illustrative examples of the polyol component include ethylene glycol, 1,4-butanediol, diethylene glycol, dipropylene glycol, 1,6-hexanediol, 1,4-cyclohexanedimethanol, xylene glycol, dimethylolpropane, poly(ethyleneoxide)glycol and poly(tetramethyleneoxide)glycol.

Acrylic Resin in Coating Layer (B)

In the present invention, an acrylic resin is also used as another component which constitutes the coating layer (B). As the acrylic resin, one having a glass transition point (Tg) of −50 to +50° C. is preferably used. The glass transition point (Tg) of the acrylic resin is preferably not higher than 25° C. The acrylic resin is preferably one which is soluble or dispersible in water (which may contain a small amount of organic solvents).

The acrylic resin can be obtained by polymerizing, preferably copolymerizing, one or more of the following acryl monomers. However, components of the acrylic resin are not limited to these monomers.

Illustrative examples of the acryl monomers include alkyl acrylate and alkyl methacrylate (wherein the alkyl group is a methyl group, ethyl group, n-propyl group, isopropyl group, n-butyl group, isobutyl group, t-butyl group, 2-ethylhexyl group, cyclohexyl group or the like); hydroxy-containing monomers such as 2-hydroxyethyl acrylate, 2-hydroxyethyl methacrylate, 2-hydroxypropyl acrylate and 2-hydroxypropyl methacrylate; epoxy-group-containing monomers such as glycidyl acrylate, glycidyl methacrylate and allyl glycidyl ether; monomers containing a carboxy group or a salt thereof such as acrylic acid, methacrylic acid, itaconic acid, maleic acid, fumaric acid, crotonic acid, styrenesulfonic acid and salts thereof (such as a sodium salt, potassium salt, ammonium salt and tertiary amine salt); amido-group-containing monomers such as acrylamide, methacrylamide, N-alkylacrylamide, N-alkylmethacrylamide, N,N-dialkylacrylamide, N,N-dialkyl methacrylate (wherein the alkyl group is a methyl group, ethyl group, n-propyl group, isopropyl group, n-butyl group, isobutyl group, t-butyl group, 2-ethylhexyl group, cyclohexyl group or the like), N-alkoxyacrylamide, N-alkoxymethacrylamide, N,N-dialkoxyacrylamide, N,N-dialkoxymethacrylamide (wherein the alkoxy group is a methoxy group, ethoxy group, butoxy group, isobutoxy group or the like), acryloyl morpholine, N-methylolacrylamide, N-methylolmethacrylamide, N-phenylacrylamide and N-phenylmethacrylamide; oxazoline-group-containing monomers such as 2-vinyl-2-oxazoline, 2-vinyl-4-methyl-2-oxazoline, 2-vinyl-5-methyl-2-oxazoline, 2-isopropenyl-2-oxazoline, 2-isopropenyl-4-methyl-2-oxazoline and 2-isopropenyl-5-methyl-2-oxazoline; and monomers having a polyalkylene oxide chain resulting from addition of a polyalkylene oxide to a carboxyl group in acrylic acid or methacrylic acid.

Further, as copolymerizable components, acid anhydride monomers such as maleic anhydride and itaconic anhydride; and monomers such as vinyl isocyanate, allyl isocyanate, styrene, α-methylstyrene, vinyl methyl ether, vinyl ethyl ether, vinyl trialkoxysilane, alkylmaleic acid monoester, alkylfumaric acid monoester, alkylitaconic acid monoester, acrylonitrile, methacrylonitrile, vinylidene chloride, ethylene, propylene, vinyl chloride, vinyl acetate and butadiene can be used.

Wax in Coating Layer (B)

Illustrative examples of wax to be used as a component in the coating layer (B) in the present invention include vegetable waxes such as a carnauba wax, candelilla wax, rice wax, Japan wax, jojoba oil, palm wax, rosin-modified wax, ouricury wax, sugarcane wax, esparto wax and bark wax; animal waxes such as a beeswax, lanolin, spermaceti wax, Chinese wax and shellac wax; mineral waxes such as a montan wax, ozokerite and ceresin wax; petroleum waxes such as a paraffin wax, microcrystalline wax and petrolatum; and synthetic hydrocarbon waxes such as a Fischer-Tropsch wax, polyethylene wax, polyethylene oxide wax, polypropylene wax and polypropylene oxide wax.

Of these waxes, at least one wax from the carnauba wax, paraffin wax and polyethylene wax are particularly preferred since they have good easy adhesions to a hard coat layer and an adhesive layer and impart good slipperiness to the laminated film. Further, from the viewpoints of environmental problems and ease of handling, aqueous dispersions thereof are more preferable.

Coating Layer (B)

The polyester resin which constitutes the coating layer (B), the polyester resin being preferably a polyester resin having a glass transition point (Tg) of 50 to 100° C., is preferably contained in the coating layer in an amount of 50 to 95 wt %. The amount of the polyester resin in the coating layer is more preferably not larger than 90 wt %, much more preferably not smaller than 60 wt %. Meanwhile, the acrylic resin which constitutes the coating layer (B), the acrylic resin being preferably an acrylic resin having a glass transition point (Tg) of −50 to +50° C, is preferably contained in the coating layer in an amount of 5 to 30 wt %. The amount of the acrylic resin in the coating layer is more preferably not larger than 25 wt %, much more preferably not smaller than 10 wt %. When the amount of the polyester resin in the coating layer exceeds 95 wt % or the amount of the acrylic resin in the coating layer becomes smaller than 5 wt %, adhesion of the coating layer may become insufficient. When the amount of the acrylic resin exceeds 30 wt %, the acrylic resin becomes incompatible with the polyester resin, whereby transparency of the coating layer may deteriorate.

Further, a content of the wax in the coating layer (B) is preferably not larger than 20 wt %, particularly preferably 0.5 to 20 wt %. The content of the wax is more preferably 1 to 10 wt %. When the content is smaller than 0.5 wt %, slipperiness on the surfaces of the film may not be achieved easily. Meanwhile, when the content is larger than 20 wt %, adhesion of the coating layer to the polyester substrate and/or easy adhesions of the coating layer to the hard coat layer and the adhesive layer may become insufficient.

Further, the coating layer may also contain, as its constituents, other components in an amount of not larger than 20 wt %. Illustrative examples of the other components include resins other than a polyester resin and an acrylic resin, a crosslinking agent, e.g., melamine, epoxy and aziridine, an antistatic agent, a colorant, a surfactant, an ultraviolet absorber and inert particles (filler).

Specific examples of the filler include inorganic fine particles such as calcium carbonate, magnesium carbonate, calcium oxide, zinc oxide, magnesium oxide, silicon oxide, sodium silicate, aluminum hydroxide, iron oxide, zirconium oxide, barium sulfate, titanium oxide, tin oxide, antimony trioxide, carbon black and molybdenum disulfide; and organic fine particles such as an acrylic crosslinked polymer, a styrene crosslinked polymer, a crosslinked silicone resin, a fluorocarbon resin, a benzoguanamine resin, a phenol resin and a nylon resin.

If too big, these fillers fall out of the coating layer, so that they preferably have an average particle diameter of not larger than 0.5 μm. Meanwhile, if too small, these fillers fail to exhibit slipperiness, so that they preferably have an average particle diameter of 0.005 to 0.5 μm, more preferably 0.01 to 0.1 μm. Of these, to prevent a water-insoluble solid substance from precipitating in an aqueous dispersion, a filler having a specific gravity of not larger than 3 is preferably selected.

The filler is contained in a composition which forms the coating film in an amount of not larger than 10 wt % based on a total weight of the polyester resin, the acrylic resin and the wax.

Particularly, when a relatively large filler having an average particle diameter of not smaller than 0.1 μm is used, its amount is preferably selected from a range of 5 to 10 wt %, while when a filler having an average particle diameter of 0.01 to 0.1 μm is used, its amount is preferably selected from a range of 8 to 10 wt %.

Next, a second biaxially oriented laminated film will be described. The second biaxially oriented laminated film has a different layer (B) from that of the above first biaxially oriented laminated film.

The layer (B) of the second biaxially oriented laminated film is a coating layer containing a polyester resin and an acrylic resin having an oxazoline group and an alkylene oxide chain.

As the polyester resin, polyester resins which are the same as those mentioned above with respect to the first biaxially oriented laminated film are used. Further, as the acrylic resin having an oxazoline group and an alkylene oxide chain, a copolymer of a monomer having an oxazoline group and an acryl monomer having an alkylene oxide chain is preferably used.

Illustrative examples of the monomer having an oxazoline group include 2-vinyl-2-oxazoline, 2-vinyl-4-methyl-2-oxazoline, 2-vinyl-5-methyl-2-oxazoline, 2-isopropenyl-2-oxazoline, 2-isopropenyl-4-methyl-2-oxazoline and 2-isopropenyl-5-methyl-2-oxazoline.

Meanwhile, illustrative examples of the acrylic resin having an alkylene oxide chain include a monomer having a polyalkylene oxide chain resulting from addition of a polyalkylene oxide to a carboxyl group in acrylic acid or methacrylic acid. The above copolymer may be those resulting from copolymerization of the acryl monomers (excluding acryl monomers having an alkylene oxide chain) and copolymerizable components mentioned above with respect to the first biaxially oriented laminated film.

The polyalkylene oxide chain of the monomer having the polyalkylene oxide chain may be a polymethylene oxide, a polyethylene oxide, a polypropylene oxide or a polybutylene oxide. The number of repeating units in the polyalkylene oxide chain is preferably 3 to 100.

As the monomer having an oxazoline group, 2-isopropenyl-2-oxazoline is industrially easy to obtain and suitable. Use of an acrylic resin having an oxazoline group improves cohesion of the coating layer, thereby further enhancing adhesions of the coating layer to the hard coat and the adhesive layer. Further, resistance to abrasion against a metal roll in a film production process or a hard coat processing process can be imparted to the coating layer.

Further, use of an acrylic resin having a polyalkylene oxide chain can achieve higher compatibility between the polyester resin and acrylic resin in the coating layer as compared with use of an acrylic resin having no polyalkylene oxide chain, thereby improving transparency of the coating layer. When the number of repeating units in the polyalkylene oxide chain is smaller than 3, the compatibility between polyester resin and the acrylic resin is so low that the transparency of the coating layer is liable to deteriorate. Meanwhile, when the number of the repeating units is larger than 100, resistance to moisture and heat of the coating layer is liable to deteriorate. Therefore, to improve adhesions to the hard coat and the like under a hot and humid atmosphere, an acrylic resin having a polyalkylene oxide chain comprising 3 to 100 repeating units is preferably used.

The monomer having an oxazoline group is preferably contained in an amount of 5 to 50 mol %, more preferably 10 to 40 mol %, based on all monomers constituting the acrylic resin. The monomer having a polyalkylene oxide chain is preferably contained in an amount of 0.1 to 20 mol %, more preferably 1 to 10 mol %, based on all monomers constituting the acrylic resin.

It is to be understood that for other matters which are not mentioned herein with respect to the second biaxially oriented laminated film, corresponding matters which are mentioned with respect to the first biaxially oriented laminated film are applied to the second biaxially oriented laminated film as they are or after modifications which are self-explanatory to those skilled in the art are made to them.

The coating layer (B) contains the polyester resin and the acrylic resin in amounts of preferably 5.3 to 94.7 wt % and 5.3 to 94.7 wt %, more preferably 50 to 90 wt % and 10 to 50 wt %, respectively, based on a total weight of the polyester resin and the acrylic resin.

When the amount of the polyester resin exceeds 94.7 wt % or the amount of the acrylic resin having an oxazoline group and a polyalkylene oxide chain becomes smaller than 5.3 wt %, cohesion of the coating layer deteriorates, so that adhesions of the coating layer to a hard coat and an adhesive may become insufficient. When the amount of the acrylic resin exceeds 94.7 wt %, adhesion of the coating layer to the polyester film deteriorates, so that the adhesions of the coating layer to the hard coat and the adhesive may become insufficient.

The coating layer (B) may also contain inert particles in an amount of not larger than 20 wt %, preferably inert particles having an average particle diameter of 0.005 to 0.5 $\mu$m in an amount of 0.01 to 20 wt %, based on the total weight of the polyester resin and the acrylic resin.

Biaxially Oriented Laminated Film

The first and second biaxially oriented laminated films of the present invention preferably have a haze value of not higher than 1%, a center line average roughness (Ra) on the surface of the coating layer of 0.002 to 0.01 $\mu$m and a friction coefficient ($\mu$s) on the surface of the coating layer of not larger than 0.8.

Further, the coating layer preferably have no optical defects having a vertical interval of not smaller than 0.5 $\mu$m and a maximum diameter of not smaller than 0.5 $\mu$m. When the optical defects having a vertical interval of not smaller than 0.5 $\mu$m and a maximum diameter of not smaller than 0.5 $\mu$m are present in the coating layer, interference fringes and missing portions are liable to occur on images on a CRT, an LCD, a PDP and the like, whereby sharpness and visibility of the images are liable to deteriorate. It is more preferable that the coating layer be free from optical defects having a vertical interval of not smaller than 0.5 $\mu$m and a maximum diameter of not smaller than 0.1 $\mu$m.

The first and second biaxially oriented laminated films of the present invention with such properties can be obtained by selecting compositions which satisfy the above properties of the laminates from the above compositions and applying a coating solution containing these compositions to at least one surface of an aromatic polyester film so as to form a coating film.

Coating Solution and Coating

In the present invention, a coating solution to be used to form the coating layer is preferably used in the form of a water-base coating solution such as an aqueous solution, aqueous dispersion or emulsified solution. To form the coating film, components other than the aforementioned components, e.g., an antistatic agent, a colorant, a surfactant, an ultraviolet absorber and the like can also be added as required. Particularly, addition of a lubricant can cause improvements in slipperiness and blocking resistance.

The water-base coating solution preferably has a solid concentration of not higher than 20 wt %, more preferably 1 to 10 wt %. When the solid concentration is lower than 1 wt %, coatability of the coating solution to the polyester film may be insufficient, while when the solid concentration is higher than 20 wt %, stability of the coating solution and/or an external appearance of the coating solution when applied may be degraded.

The water-base coating solution can be applied to the aromatic polyester film at any stage. The coating solution is preferably applied to the aromatic polyester film during its production process, more preferably before completion of orientation/crystallization.

The film before completion of crystallization/orientation is an unstretched film, a monoaxially stretched film obtained by stretching an unstretched film in either a longitudinal direction or a transverse direction, a biaxially stretched film which is obtained by stretching an unstretched film in biaxial directions, i.e., longitudinal and transverse directions, at low stretch ratios and still remains stretchable after the biaxial stretching (i.e., a biaxially stretched film before re-stretched in a longitudinal or transverse direction at the end so as to complete orientation/crystallization), or the like.

In particular, it is preferred to apply a water-base coating solution containing the above composition to an unstretched film or a monoaxially stretched film, stretch the film longitudinally and/or transversely as it is, and heat-set the stretched film.

When the water-base coating solution is applied to the film, it is preferred to subject the surface of the film to physical treatment such as corona surface treatment, flame treatment or plasma treatment as pretreatment for improving coatability or to use a surfactant which is chemically inert to a composition in combination with the composition.

The surfactant promotes wettability of the water-base coating solution to the polyester film. Illustrative examples of the surfactant include anionic surfactants and nonionic surfactants such as polyoxyethylene alkyl phenyl ether, polyoxyethylene-fatty acid ester, sorbitan fatty acid ester, glycerine fatty acid ester, fatty acid metallic soap, an alkylsulfate, an alkylsulfonate and an alkylsulfosuccinate. The surfactant is preferably contained in the composition which forms the coating film in an amount of 1 to 10 wt %.

The coating solution is preferably applied in such an amount that the coating film would have a thickness of 0.02 to 0.3 $\mu$m, preferably 0.07 to 0.25 $\mu$m. When the thickness of the coating film is too small, adhesion may become insufficient, while when the thickness of the coating film is too large, blocking may occur or the haze value may become high.

To apply the coating solution, any known coating technique can be used. For example, roller coating, gravure coating, roll brushing, spray coating, air knife coating, impregnation, curtain coating and the like can be used solely or in combination. The coating film may be formed on one or both surfaces of the film as required.

Next, the hard coat laminated film of the present invention will be described.

The hard coat laminated film of the present invention, as described above, has a hard coat layer laminated on the coating layer (B) of the first or second biaxially oriented laminated polyester film of the present invention. The hard coat layer has universal hardness (UC) which satisfies the following relational expression:

$$0.6 \times UC \leq UHF \leq 1.2 \times UC$$

wherein UC is the universal hardness of the hard coat layer, and UHF is universal hardness measured from the coating layer (B) side of the biaxially oriented laminated polyester film.

The universal hardness is determined by measuring a relationship between pressures and degrees of distortions of a steel ball by means of a small distortion surface hardness meter and determining a pressure (gr) corresponding to a given degree of distortion.

When the universal hardness of the surface of the coating layer is lower than 0.6 times that of the hard coat, an antireflection layer coated and formed on the surface of the hard coat layer is liable to be cracked, so that the resulting film is not favorable as a film for optical use. Meanwhile, when the universal hardness of the surface is higher than 1.2 times that of the hard coat, the hard coat layer is liable to be cracked, so that the resulting film is not favorable as a film for optical use.

To achieve such a relationship by adjustment of the universal hardness of the film, a refractive index nz in a thickness direction of the film is varied. When a degree of surfacial orientation is increased, nz is decreased and the universal hardness is increased, while when the degree of surfacial orientation is decreased, nz is increased and the universal hardness is decreased.

As the hard coat layer, a commonly used hard coat layer such as a radiation curable hard coat layer or a silane-based hard coat layer can be used. Particularly, the radiation curable hard coat layer is preferred, and above all, an ultraviolet curable hard coat layer is preferably used.

Illustrative examples of an ultraviolet curable composition used for formation of the hard coat layer include ultraviolet curable compositions such as an urethane-acrylate composition, an epoxy-acrylate composition and a polyester-acrylate composition.

To laminate the hard coat layer on the coating layer, a composition to form the hard coat layer is coated on the coating layer and then cured by heating, irradiation of radiation (such as ultraviolet radiation) or other means. The thickness of the hard coat layer is not particularly limited but is generally around 1 to 15 $\mu$m.

On the thus formed hard coat layer, an antireflection layer may further be formed. The antireflection layer is obtained by laminating a number of layers having different refractive indices alternately, and its constitution is generally well known. For example, one comprising a low-refractive-index layer ($SiO_2$, 30 nm), a high-refractive-index layer ($TiO_2$, 30 nm), a low-refractive-index layer ($SiO_2$, 30 nm), a high-refractive-index layer ($TiO_2$, 100 nm) and a low-refractive-index layer ($SiO_2$, 100 nm); one comprising a high-refractive-index layer (ITO, 20 nm), a low-refractive-index layer (AlSiO, 20 nm), a high-refractive-index layer (ITO, 88 nm) and a low-refractive-index layer (AlSiO, 88 nm); and one comprising a high-refractive-index conductive layer (ITO, 20 nm), a low-refractive-index layer ($SiO_2$, 20 nm), a high-refractive-index conductive layer (ITO, 93 nm) and a low-refractive-index layer ($SiO_2$, 93 nm) are known.

In the present invention, the antireflection layer can be formed optionally. The antireflection layer is generally laminated on the hard coat layer by sputtering. Reflection of extraneous light which interferes with visibility of a display can be prevented by means of the antireflection layer.

In addition to those mentioned above, there is an antireflection layer which is a single-layer film which mainly prevents reflection of yellow light. Such an antireflection layer is suitable for preventing reflection of light on an optical lens since violet which is a complementary color of yellow can be seen, while a multilayer antireflection film is more suitable for preventing reflection of light on a display.

The hard coat layer laminated film of the present invention is suitably used in a light transmission layer of a display.

EXAMPLES

Hereinafter, the present invention will be described in more detail with reference to Examples. However, the present invention is not limited to the following Examples. In the Examples and Comparative Examples, "part" indicates "part by weight". Further, in the Examples and Comparative Examples, properties were evaluated in the following manners.

(1) Haze Value

A haze value of a film was measured by use of a haze meter (NDH-20) manufactured by Nippon Denshoku Industries Co., Ltd. Haze of the film was evaluated in accordance with the following criteria.

⊚: haze value≦0.5% . . . Haze of the film is very good.
○: 0.5%<haze value≦1.0% . . . Haze of the film is good.
X: 1.0%<haze value . . . Haze of the film is poor.

(2) Center Line Average Surface Roughness (Ra)

In accordance with JIS B0601, a chart was drawn by use of a high precision surface roughness meter SE-3FAT manufactured by Kosaka Laboratory Ltd. with a needle radius of 2 μm, under a load of 30 mg and at a magnification of 200,000 and a cutoff of 0.08 mm, a portion having a measured length of L in a direction of the center line of the surface roughness curve was extracted from the curve, the roughness curve was expressed as Y=f(x) with the center line of the extracted portion being an X axis and a direction of longitudinal magnification being a Y axis, and a value obtained by the following expression was expressed in the unit "nm". Further, the measurement was made four times with a reference length of 1.25 mm, and the center line average surface roughness was expressed as an average value thereof.

$$Ra=(1/L)\int_0^1 |f(x)|dx$$

(3) Slipperiness

A coefficient of static friction (ps) between a surface having a coating film formed thereon and a polyester film (surface having no coating film formed thereon) was measured in accordance with ASTM D1894-63 by use of a slipperiness measuring device manufactured by Toyo Tester Industries Co., Ltd. Based on the measured static friction coefficient ($\mu s$), slipperiness of the film was evaluated in accordance with the following criteria. By use of the following expression, the static friction coefficient ($\mu s$) was calculated from tensile strength (F) between the coating film formed surface and the polyester film which was measured under a load (W) of 1 kg by use of a glass board as a thread board.

$\mu s=F(g)/W(g)$

⊚: static friction coefficient ($\mu s$)≦0.5 . . . Slipperiness is very good.
○: 0.5<static friction coefficient ($\mu s$)≦0.8 . . . Slipperiness is good.
X: 0.8<static friction coefficient ($\mu s$) . . . Slipperiness is poor.

(4) Coefficient of Friction ($\mu s$)

Glass was placed and fixed under two stacked films, the front surface of one of the films being in contact with the back surface of the other film. The film in a lower position (i.e., film in contact with the glass plate) out of the stacked films was taken up on a low-speed roller (about 10 cm/min), and a detector was fixed to one end of the film in an upper position (i.e., end of the upper film which is opposite to a direction in which the lower film was taken up) so as to detect tensile strength (F) between the films. A thread placed on the upper film during the detection had a back surface having an area of 50 cm² (80 mm×62.5 mm) and made of 80° neoprene rubber and also had a weight (W) of 1.2 kg.

A static friction coefficient ($\mu s$) was calculated by use of the following expression.

$\mu s=F(g)/W(g)$ (5) Adhesion
(5-1) Adhesion to Hard Coat Layer

A hard coat layer having a thickness of 10 μm was formed on a coating-film-formed surface of an easily adhesive laminated film and cut in a cross-cut pattern (consisting of 100 grids each of which has a size of 1 mm²). A scotch tape (manufactured by Nichiban Co., Ltd.) having a width of 24 mm was stuck on the hard coat layer and then peeled abruptly at a peel angle of 180°. Then, the peeled surface was observed and evaluated in accordance with the following criteria.

5: Peeled area is smaller than 10% . . . . Adhesion is very good.
4: Peeled area is 10% to smaller than 20% . . . . Adhesion is good.
3: Peeled area is 20% to smaller than 30% . . . . Adhesion is rather good.
2: Peeled area is 30% to smaller than 40% . . . . Adhesion is poor.
1: Peeled area is 40% or larger . . . . Adhesion is very poor.

(5-2) Adhesion to Adhesive (PSA)

An adhesive (PSA) layer having a thickness of 20 μm was formed on a coating-film-formed surface of an easily adhesive polyester film, and the film was stuck to float glass such that the adhesive layer was in contact with the float glass. Then, these were left to stand at 23° C. and 65% RH for one day, and then the film was peeled at a peel angle of 90°. A state of the adhesive (PSA) remaining on the surface of the glass was observed and evaluated in accordance with the following criteria.

As the adhesive (PSA: Pressure Sensitive Adhesive), an urethane-containing acrylate copolymer (wherein the acryl component comprised n-butyl acrylate (86 mol %) and methyl acrylate (14 mol %)) was used.

5: Adhesive (PSA) remaining area is smaller than 10% . . . . Adhesion is very good.
4: Adhesive (PSA) remaining area is 10% to smaller than 20% . . . . Adhesion is good.
3: Adhesive (PSA) remaining area is 20% to smaller than 30% . . . . Adhesion is rather good.
2: Adhesive (PSA) remaining area is 30% to smaller than 40% . . . . Adhesion is poor.
1: Adhesive (PSA) remaining area is 40% or larger . . . . Adhesion is very poor.

(6) Adhesive Strength
(6-1) Adhesive Strength to Hard Coat Layer

A hard coat layer having a thickness of 5 μm was formed on a coating-film-formed surface of an easily adhesive laminated film and cut in a cross-cut pattern (consisting of 100 grids each of which has a size of 1 mm²). A scotch tape (manufactured by Nichiban Co., Ltd.) having a width of 24 mm was stuck on the hard coat layer and then peeled abruptly at a peel angle of 180°. Then, the peeled surface was observed and evaluated in accordance with the following criteria.

⊚: Peeled area is smaller than 10% . . . . Adhesive strength is very good.
○: Peeled area is 10% to smaller than 30% . . . . Adhesive strength is good.
X: Peeled area is 30% or larger . . . . Adhesive strength is very poor.

(6-2) Adhesive Strength to Adhesive (PSA)

An adhesive (PSA) layer having a thickness of 10 μm was coated on a coating-film-formed surface of an easily adhesive polyester film. Then, the resulting film was left to stand in a thermo-hygrostat at 60° C. and 80% RH for 24 hours, and then an epoxy-resin-based adhesive was applied thereon and then peeled. The results were evaluated in accordance with the following criteria.

As the adhesive (PSA: Pressure Sensitive Adhesive), an urethane-containing acrylate copolymer (wherein the acryl component comprised n-butyl acrylate (86 mol %) and methyl acrylate (14 mol %)) was used.
◎: Adhesive strength is strong to the extent that base film is ruptured.
○: Adhesive is peeled off but film is still practical.
X: Adhesive is easily peeled off and film is not practical.

(7) Blocking Resistance

Two films were stacked such that a coating-film-formed surface of one of the films made contact with a surface of the other film which had no coating film formed thereon. To the stacked films, a pressure of 0.6 kg/cm² was applied at 60° C. and 80% RH for 17 hours. Thereafter, the films were peeled away from each other, and based on the peeling strength, blocking resistance was evaluated in accordance with the following criteria.
◎: peeling strength<98 mN/5 cm . . . Blocking resistance is very good.
○: 98 mN/5 cm≦peeling strength<147 mN/5 cm . . . Blocking resistance is good.
Δ: 147 mN/5 cm≦peeling strength<196 mN/5 cm . . . Blocking resistance is rather good.
X: 196 mN/5 cm≦peeling strength . . . Blocking resistance is poor.

(8) Defects of Coating Layer

Measurement of Size

Defects on a coating layer such as crawling, foreign materials and scratches within an area of 1 m² were examined visually, and when they were found, the defects of the coating layer were measured for a vertical interval and a size by use of a laser light microscope (VF-750) manufactured by KEYENCE CORPORATION. The number of defects on the coating layer which had a vertical interval of not smaller than 0.5 μm and a maximum diameter of not smaller than 0.1 μm was counted.
◎: There are no defects on the coating layer which have a vertical interval of not smaller than 0.5 μm and a maximum diameter of not smaller than 0.1 μm . . . . very good
○: There are no defects on the coating layer which have a vertical interval of not smaller than 0.5 μm and a maximum diameter of not smaller than 0.5 μm . . . . good
X: There are defects on the coating layer which have a vertical interval of not smaller than 0.5 μm and a maximum diameter of not smaller than 0.5 μm . . . . poor (9) Image Definition and Visibility A film was stuck on a CRT (RDF19S) manufactured by Mitsubishi Electric Corporation, and occurrences of interference fringes and optical defects were observed visually.
◎: There are neither interference fringes nor optical defects . . . . very good
○: Some interference fringes and optical defects are observed but have no influences on an image . . . . good
X: Interference fringes and optical defects are observed and have influences on definition and visibility of an image . . . . poor

(10) Abrasion Resistance

A surface of a hard coat was abraded by use of steel wool #0000 so as to check whether the surface of the hard coat was scratched. A hard coat which was not scratched was evaluated to have good abrasion resistance (○), and a hard coat which was scratched was evaluated to have poor abrasion resistance (X).

(11) Falling Ball Impact Test

A steel ball having a weight of 0.5 kg was dropped from a height of 1 m onto a sample placed horizontally on an iron plate three times. A sample having no cracks observed in both an antireflection layer and a hard coat was evaluated as good (○), and a sample having cracks observed in either or both of an antireflection layer and a hard coat was evaluated as poor (X).

(12) Glass Transition Point (Tg)

Using a differential calorimeter (910 DSC, product of Dupont Instruments), 20 mg of a sample filled in an aluminum pan was heated from room temperature to 300° C. at a temperature increasing rate of 20° C./min, kept at 300° C. for 1 minute, then quenched to a temperature which is not higher than room temperature, and re-heated from room temperature at temperature increasing rate of 20° C./min so as to measure a glass transition point (Tg).

(13) Thickness of Film

A thickness of a film having a coating film laminated thereon (or thickness of a film when the sample has no coating film laminated thereon) was measured at 10 points by means of a micrometer, and an average value was calculated from the measurements and taken as the thickness of the film.

(14) Thickness of Coating Film

This was calculated from an amount of an applied coating solution per m² and a solid concentration of the coating solution.

(15) Glass Transition Temperature

About 10 mg of sample was filled in an aluminum pan for measurement, and the pan was mounted on a differential calorimeter (V4.OB2000-type DSC, product of Dupont Instruments). Then, the pan was heated from 25° C. to 300° C. at a rate of 20° C./min, kept at 300° C. for 5 minutes, then taken out of the calorimeter, and immediately transferred onto ice so as to be quenched. The pan was mounted on the differential calorimeter again and heated from 25° C. at a rate of 20° C./min so as to measure a glass transition temperature (Tg: ° C.).

(16) Intrinsic Viscosity

An intrinsic viscosity (IV:dl/g) of a polyester was measured in an o-chlorophenol solution at 25° C.

Examples 1—1 to 1-3 and Comparative Examples 1—1 to 1-3

Molten polyethylene terephthalates (intrinsic viscosity= 0.65 dl/g, glass transition point: 78° C.) were extruded from a die and cooled on a cooling drum in accordance with a conventional method so as to obtain unstretched films. Then, the unstretched films were stretched to 3.6 times in a longitudinal direction, and aqueous coating solutions with a solid concentration of 8 wt % of compositions for coating films shown in Table 1 were uniformly coated on both surfaces of the stretched films by means of a roll coater.

TABLE 1

| Coating Agent | Composition of Easily Adhesive Layer (wt %) | | | | | | | |
|---|---|---|---|---|---|---|---|---|
| | Polyester Resin 1-1 | Polyester Resin 1-2 | Acrylic Resin 1-1 | Acrylic Resin 1-2 | Inert Particles 1-1 | Wax 1-1 | Wax 1-2 | Wetting Agent 1-1 |
| Coating Solution 1-1 | 70 | — | 15 | — | — | 5 | — | 10 |
| Coating Solution 1-2 | 67 | — | 15 | — | 5 | — | 3 | 10 |
| Coating Solution 1-3 | 67 | — | 15 | — | 5 | 3 | — | 10 |
| Coating Solution 1-4 | — | 75 | 15 | — | — | — | — | 10 |
| Coating Solution 1-5 | 75 | — | — | 15 | — | — | — | 10 |
| Coating Solution 1-6 | — | 75 | — | 15 | — | — | — | 10 |

In Table 1, components in the coating layers represent the following polymers and compounds.

Polyester Resin 1—1: Polyester copolymer containing, as acid components, 70 mol % of 2,6-naphthalenedicarboxylic acid, 24 mol % of isophthalic acid and 6 mol % of 5-sodium sulfoisophthalic acid and, as glycol components, 90 mol % of ethylene glycol and 10 mol % of diethylene glycol (Tg=85° C.).

The polyester resin 1—1 was produced in the following manner in accordance with a method described in Example 1 of JP-A 6-116487. That is, 188 parts of dimethyl 2,6-naphthalenedicarboxylate, 51 parts of dimethyl isophthalate, 20 parts of dimethyl 5-sodium sulfoisophthalate, 131 parts of ethylene glycol and 10 parts of diethylene glycol were charged into a reactor, 0.05 parts of tetrabutoxytitanium were added thereto, and the resulting mixture was heated under a nitrogen atmosphere with a temperature controlled to 230° C. so as to distill out methanol produced, thereby carrying out an ester interchange reaction. Then, the temperature of the reaction system was gradually increased to 255° C. and an internal pressure of the system was reduced to 1 mmHg to carry out a polycondensation reaction. Thus, the polyester resin 1—1 was obtained.

Polyester Resin 1-2: Polyester copolymer containing, as acid components, 40 mol % of terephthalic acid, 54 mol % of isophthalic acid and 6 mol % of 5-sodium sulfoisophthalic acid and, as glycol components, 70 mol % of ethylene glycol and 30 mol % of diethylene glycol (Tg=35° C.).

To obtain the polyester resin 1-2, a polycondensation reaction was carried out in the same method as in the case of the polyester resin 1—1 except that 92 parts of dimethyl terephthalate, 125 parts of dimethyl isophthalate, 21 parts of dimethyl 5-sodium sulfoisophthalate, 127 parts of ethylene glycol and 36 parts of diethylene glycol were charged, so as to obtain the polyester copolymer.

Acrylic Resin 1—1: Acrylic copolymer comprising 15 mol % of methyl methacrylate, 75 mol % of ethyl acrylate, 5 mol % of N-methylolacrylamide and 5 mol % of 2-hydroxyethyl methacrylate (Tg=0° C.).

The acrylic resin 1—1 was produced in the following manner in accordance with a method described in Production Examples 1 to 3 of JP-A 63-37167. That is, 3 parts of sodium lauryl sulfonate as a surfactant and 181 parts of ion exchanged water were charged into a four neck flask and heated to 60° C. in a current of nitrogen. Then, 0.5 parts of ammonium persulfate and 0.2 parts of sodium hydrogen nitrite were added thereto as polymerization initiators, and a mixture of 14.9 parts of methyl methacrylate, 74.4 parts of ethyl acrylate, 4.3 parts of N-methylolacrylamide and 6.4 parts of 2-hydroxyethyl methacrylate which were monomers was added dropwise over 3 hours while a temperature of the solution constantly adjusted to 60 to 70° C. Even after completion of the dropwise addition, the resulting solution was still kept in the above temperature range for 2 hours and allowed to continue to react under agitation. Then, the resulting solution was cooled, thereby obtaining an aqueous dispersion of the acrylic resin 1—1 with a solid content of 35%.

Acrylic Resin 1-2: Acrylic copolymer comprising 80 mol % of methyl methacrylate, 10 mol % of ethyl acrylate, 5 mol % of N-methylolacrylamide and 5 mol % of 2-hydroxyethyl methacrylate (Tg=80° C.).

To obtain the acrylic resin 1-2, a polymerization reaction was carried out in the same manner as in the case of the acrylic resin 1—1 except that 79.3 parts of methyl methacrylate, 9.9 parts of ethyl acrylate, 4.3 parts of N-methylolacrylamide and 6.4 parts of 2-hydroxyethyl methacrylate were charged as monomers, so as to obtain an aqueous dispersion of the acrylic resin.

Inert Particles 1—1: Silica filler (average particle diameter: 100 nm) (product of Nissan Chemical Industries, Ltd., trade name: SNOWTEX ZL)

Wax 1—1: Carnauba wax (product of Chukyo Yushi Co., Ltd., trade name: SELOSOL 524)

Wax 1-2: Polyethylene wax (product of Toho Chemical Industry Co., Ltd., trade name: HITECH E-3100)

Wetting Agent 1—1: Polyoxyethylene (n=7) lauryl ether (product of Sanyo Chemical Industries, Ltd., trade name: NAROACTY N-70)

Then, these coated films were dried at 95° C., stretched to 3.8 times in a transverse direction at 120° C., shrunk 3% in the width direction at 220° C. and heat-set so as to obtain laminated films each having a thickness of 188 μm. The results of evaluations of the obtained laminated films are shown in Table 2. The thickness of the coating film was 0.15 μm.

Example 1-4

A mol %en polyethylene-2,6-naphthalate (intrinsic viscosity=0.60 dl/g, glass transition point: 121° C.) was extruded from a die and cooled on a cooling drum in accordance with a conventional method so as to obtain an unstretched film. Then, the unstretched film was stretched to 3.6 times in a longitudinal direction, and an 8% aqueous coating solution of a composition for a coating film (the coating solution 1—1 in Table 1) was uniformly coated on both surfaces of the stretched film by means of a roll coater. Then, the coated film was dried at 105° C., stretched to 3.8 times in a transverse direction at 140° C., shrunk 3% in the width direction at 230° C. and heat-set so as to obtain a laminated film having a thickness of 188 μm. The results of evaluations of the obtained laminated film are shown in Table 2. The thickness of the coating film was 0.15 μm.

◯: Most of the properties are good and none of them are bad overall evaluation is good.
X: Some of the properties are bad . . . overall evaluation is bad.

Examples 2-1 to 2-3

Molten polyethylene terephthalates (intrinsic viscosity= 0.64 dl/g, glass transition point: 78° C.) were extruded from a die and cooled on a cooling drum in accordance with a conventional method so as to obtain unstretched films. Then, the unstretched films were stretched to 3.6 times in a longitudinal direction, and aqueous coating solutions with a solid concentration of 8% of the following compositions for coating films (shown in Table 3) were uniformly coated on both surfaces of the stretched films by means of a roll coater.

TABLE 2

| | Coating Agent | Haze | Surface Roughness (Ra) (μm) | Slipperiness | Adhesion Hard Coat | Adhesive (PSA) | Blocking Resistance | Overall Evaluation |
|---|---|---|---|---|---|---|---|---|
| Ex. 1-1 | Coating Solution 1-1 | ◎ | 0.007 | ◯ | 5 | 5 | ◯ | ◯ |
| Ex. 1-2 | Coating Solution 1-2 | ◎ | 0.007 | ◎ | 5 | 5 | ◎ | ◎ |
| Ex. 1-3 | Coating Solution 1-3 | ◯ | 0.007 | ◎ | 5 | 4 | ◎ | ◎ |
| Ex. 1-4 | Coating Solution 1-1 | ◎ | 0.008 | ◯ | 5 | 5 | ◯ | ◯ |
| C. Ex. 1-1 | Coating Solution 1-4 | ◎ | 0.007 | X | 5 | 5 | X | X |
| C. Ex. 1-2 | Coating Solution 1-5 | ◎ | 0.007 | X | 5 | 1 | Δ | X |
| C. Ex. 1-3 | Coating Solution 1-6 | ◎ | 0.007 | X | 5 | 1 | X | X |

Ex.: Example,
C. Ex.: Comparative Example

As is obvious from the results shown in Table 2, the biaxially oriented laminated polyester films of the present invention were excellent in transparency, slipperiness and adhesions to a hard coat layer and an adhesive layer as well as blocking resistance and were useful as an easily adhesive laminated film for optical use.

The overall evaluations shown in Table 2 were made based on the following criteria in accordance with the results of evaluations of haze, surface roughness, a coefficient of friction, adhesions (to a hard coat and an adhesive) and blocking resistance.
◎: Most of the properties are very good and none of them are bad . . . overall evaluation is very good.

TABLE 3

| | Composition of Easily Adhesive Layer (wt %) | | | | | |
|---|---|---|---|---|---|---|
| Coating Agent | Polyester Resin 2-1 | Acrylic Resin 2-1 | Wax 2-1 | Wax 2-2 | Inert Particles 2-1 | Wetting Agent 2-1 |
| Coating Solution 2-1 | 60 | 20 | — | 10 | — | 10 |
| Coating Solution 2-2 | 67 | 20 | 3 | — | — | 10 |
| Coating Solution 2-3 | 62 | 20 | 3 | — | 5 | 10 |

In Table 3, components in the coating layers represent the following polymers and compounds.
Polyester Resin 2-1: Polyester copolymer containing, as acid components, 90 mol % of terephthalic acid, 4 mol % of isophthalic acid and 6 mol % of 5-sodium sulfoisophthalic acid and, as glycol components, 90 mol % of ethylene glycol and 10 mol % of diethylene glycol (Tg=70° C.).

Acrylic Resin 2-1: Acrylic copolymer comprising 50 mol % of methyl methacrylate, 40 mol % of ethyl acrylate, 5 mol % of N-methylolacrylamide and 5 mol % of 2-hydroxyethyl methacrylate (Tg=40° C.).

Wax 2-1: Carnauba wax (product of Chukyo Yushi Co., Ltd., trade name: SELOSOL 524)

Wax 2—2: Paraffin wax (product of Chukyo Yushi Co., Ltd., trade name: SELOSOL 428)

Inert Particles 2-1: Silica filler (average particle diameter: 100 nm) (product of Nissan Chemical Industries, Ltd., trade name: SNOWTEX ZL)

Wetting Agent 2-1: Polyoxyethylene (n=7) lauryl ether (product of Sanyo Chemical Industries, Ltd., trade name: NAROACTY N-70)

Then, these coated films were dried at 95° C., stretched to 3.8 times in a transverse direction at 120° C., shrunk 3% in the width direction at 220° C. and heat-set so as to obtain laminated films each having a thickness of 188 μm. The results of evaluations of the obtained laminated films are shown in Table 4. The thickness of the coating film was 0.15 μm. Further, the laminated films were prepared in an environment whose degree of cleanness belongs to a class of 1,000.

Example 2-4

A mol %en polyethylene-2,6-naphthalate (intrinsic viscosity=0.60 dl/g, glass transition point: 121° C.) was extruded from a die and cooled on a cooling drum in accordance with a conventional method so as to obtain an unstretched film. Then, the unstretched film was stretched to 3.6 times in a longitudinal direction, and an aqueous coating solution with a solid concentration of 8% of a composition for a coating film (the coating solution 2-1 in Table 3) was uniformly coated on both surfaces of the stretched film by means of a roll coater. Then, the coated film was dried at 105° C., stretched to 3.8 times in a transverse direction at 140° C., shrunk 3% in the width direction at 230° C. and heat-set so as to obtain a laminated film having a thickness of 188 μm. The results of evaluations of the obtained laminated film are shown in Table 4. The thickness of the coating film was 0.15 μm. Further, the laminated film was prepared in an environment whose degree of cleanness belongs to a class of 1,000.

Comparative Example 2-1

A film was obtained in the same process as in Example 2-1 except that no coating layers were formed. The results of evaluations of the obtained film are shown in Table 4.

As is obvious from the results shown in Table 4, the biaxially oriented laminated polyester films of the present invention were excellent in image definition, transparency, slipperiness and adhesions to a hard coat layer and an adhesive layer and were useful as an easily adhesive laminated film for an antireflective purpose.

The overall evaluations shown in Table 4 were made based on the following criteria in accordance with the results of evaluations of drawbacks (size measurements, image definitions and visibilities), hazes, coefficients of friction and adhesions (to a hard coat and an adhesive) of the coating layers.

◎: Most of the properties are very good and none of them are bad . . . overall evaluation is very good.

X: Some of the properties are bad . . . overall evaluation is bad.

TABLE 4

|  | Coating Agent | Drawbacks of Coating Layers | | | | Adhesion | | Overall Evaluation |
|---|---|---|---|---|---|---|---|---|
|  |  | Image | | | | | | |
|  |  | Size Measurement | Definition Visibility | Haze | Slipperiness | Hard Coat | Adhesive (PSA) |  |
| Ex. 2-1 | Coating Solution 2-1 | ◎ | ◎ | ◎ | ◎ | 5 | 4 | ◎ |
| Ex. 2-2 | Coating Solution 2-2 | ◎ | ◎ | ◎ | ◎ | 5 | 5 | ◎ |
| Ex. 2-3 | Coating Solution 2-3 | ◎ | ◎ | ◎ | ◎ | 5 | 5 | ◎ |
| Ex. 2-4 | Coating Solution 2-1 | ◎ | ◎ | ◎ | ◎ | 5 | 4 | ◎ |
| C. Ex. 2-1 | None | ◎ | ◎ | ◎ | X | 1 | 1 | X |

Ex.: Example
C. Ex.: Comparative Example

Examples 3-1 and 3-2 and Comparative Example 3-1

Molten polyethylene terephthalates (intrinsic viscosity=0.64 dl/g, glass transition point: 78° C.) were extruded from a die and cooled on a cooling drum in accordance with a conventional method so as to obtain unstretched films. Then, the unstretched films were stretched to 3.6 times in a longitudinal direction, and aqueous coating solutions with a solid concentration of 8 wt % of the following compositions for coating films (shown in Table 5) were uniformly coated on both surfaces of the stretched films by means of a roll coater.

TABLE 5

|  | Composition of Easily Adhesive Layer (wt %) | | | | |
|---|---|---|---|---|---|
| Coating Agent | Polyester Resin 3-1 | Acrylic Resin 3-1 | Wax 3-1 | Wax 3-2 | Wetting Agent 3-1 |
| Coating Solution 3-1 | 70 | 15 | 5 | — | 10 |
| Coating Solution 3-2 | 70 | 15 | — | 5 | 10 |
| Coating Solution 3-3 | 74 | 15 | 1 | — | 10 |

TABLE 5-continued

| | Composition of Easily Adhesive Layer (wt %) | | | | |
|---|---|---|---|---|---|
| Coating Agent | Polyester Resin 3-1 | Acrylic Resin 3-1 | Wax 3-1 | Wax 3-2 | Wetting Agent 3-1 |
| Coating Solution 3-4 | 60 | 15 | 15 | — | 10 |
| Coating Solution 3-5 | 90 | — | — | — | 10 |

In Table 5, components in the coating layers represent he following polymers and compounds.

Polyester Resin 3-1: Polyester copolymer containing, as acid components, 90 mol % of terephthalic acid, 4 mol % of isophthalic acid and 6 mol % of 5-sodium sulfoisophthalic acid and, as glycol components, 90 mol % of ethylene glycol and 10 mol % of diethylene glycol (Tg=70° C.).

Acrylic Resin 3-1: Acrylic copolymer comprising 50 mol % of methyl methacrylate, 40 mol % of ethyl acrylate, 5 mol % of N-methylolacrylamide and 5 mol % of 2-hydroxyethyl methacrylate (Tg=40° C.).

Wax 3-1: Carnauba wax (product of Chukyo Yushi Co., Ltd., trade name: SELOSOL 524)

Wax 3-2: Polyethylene wax (product of Toho Chemical Industry Co., Ltd., trade name: HITECH E-3100)

Wetting Agent 3-1: Polyoxyethylene (n=7) lauryl ether (product of Sanyo Chemical Industries, Ltd., trade name: NAROACTY N-70)

Then, these coated films were dried at 95° C., stretched to 3.8 times in a transverse direction at 120° C., shrunk 3% in the width direction at 220° C. and heat-set so as to obtain laminated films each having a thickness of 188 μm. The results of evaluations of the obtained laminated films are shown in Table 6. The thickness of the coating film was 0.15 μm.

Example 3—3

A mol %en polyethylene-2,6-naphthalate (intrinsic viscosity=0.60 dl/g, glass transition point: 121° C.) was extruded from a die and cooled on a cooling drum in accordance with a conventional method so as to obtain an unstretched film. Then, the unstretched film was stretched to 3.6 times in a longitudinal direction, and an aqueous coating solution with a solid concentration of 8% of a composition for a coating film (the coating solution 3-1 in Table 5) was uniformly coated on both surfaces of the stretched film by means of a roll coater. Then, the coated film was dried at 105° C., stretched to 3.8 times in a transverse direction at 140° C., shrunk 3% in the width direction at 230° C. and heat-set so as to obtain a laminated film having a thickness of 188 μm. The results of evaluations of the obtained laminated film are shown in Table 6. The thickness of the coating film was 0.15 μm.

Examples 3-4 and 3-5

Laminated films were obtained in the same process as in Example 3-1 except that the composition for a coating film was changed to the coating solution 3—3 or 3-4 shown in Table 5. The results of evaluations of the obtained laminated films are shown in Table 6.

Comparative Example 3-2

A film was obtained in the same process as in Examples 3-1 to 3—3 except that no coating layers were formed. The results of evaluations of the obtained film are shown in Table 6.

TABLE 6

| | | | Surface | | Adhesion | | | |
|---|---|---|---|---|---|---|---|---|
| | Coating Agent | Haze | Roughness (Ra) (μm) | Slipperiness | Hard Coat | Adhesive (PSA) | Blocking Resistance | Overall Evaluation |
| Ex. 3-1 | Coating Solution 3-1 | ⊚ | 0.006 | ⊚ | 5 | 5 | ⊚ | ⊚ |
| Ex. 3-2 | Coating Solution 3-2 | ⊚ | 0.006 | ⊚ | 5 | 5 | ⊚ | ⊚ |
| Ex. 3-3 | Coating Solution 3-1 | ⊚ | 0.006 | ⊚ | 5 | 5 | ⊚ | ⊚ |
| Ex. 3-4 | Coating Solution 3-3 | ⊚ | 0.006 | ⊚ | 5 | 5 | ⊚ | ⊚ |
| Ex. 3-5 | Coating Solution 3-4 | ⊚ | 0.007 | ⊚ | 4 | 4 | ⊚ | ⊚ |
| C. Ex. 3-1 | Coating Solution 3-5 | ⊚ | 0.006 | X | 5 | 4 | Δ | X |
| C. Ex. 3-2 | None | ⊚ | 0.006 | X | 1 | 1 | ⊚ | X |

Ex.: Example
C. Ex.: Comparative Example

As is obvious from the results shown in Table 6, the biaxially oriented laminated polyester films of the present invention were excellent in transparency, slipperiness and adhesions to a hard coat layer and an adhesive layer as well as blocking resistance and were useful as an easily adhesive laminated film for optical use.

The overall evaluations shown in Table 6 were made based on the following criteria in accordance with the results of evaluations of haze, surface roughness, a coefficient of friction, adhesions (to a hard coat and an adhesive) and blocking resistance.

⊚: Most of the properties are very good and none of them are bad . . . overall evaluation is very good.
X: Some of the properties are bad . . . overall evaluation is bad.

Examples 4-1 to 4—4 and Comparative Example 4-1 and 4-2

Molten polyethylene terephthalates (intrinsic viscosity= 0.63 dl/g, glass transition point: 79° C.) were extruded from a die and cooled on a cooling drum in accordance with a conventional method so as to obtain unstretched films. Then, the unstretched films were stretched to 3.4 times in a longitudinal direction, and 8% aqueous coating solutions of coating agents (compositions of coating solutions 4-1 to 4-6 are compositions for coating films shown in the following Table 7) shown in Table 8 were uniformly coated on both surfaces of the stretched films by means of a roll coater.

carry out a polycondensation reaction. Thus, the polyester resin 4-2 was obtained.

Acrylic Resin 4-1: This resin comprises 30 mol % of methyl methacrylate, 30 mol % of 2-isopropenyl-2-oxazoline, 10 mol % of polyethylene oxide (n=10) methacrylate and 30 mol % of acrylamide (Tg=50° C.).

The acrylic resin 4-1 was produced in the following manner in accordance with a method described in Produc-

TABLE 7

| Coating Agent | Composition of Easily Adhesive Layer (wt %) | | | | | | | |
|---|---|---|---|---|---|---|---|---|
| | Polyester Resin 4-1 | Polyester Resin 4-2 | Acrylic Resin 4-1 | Acrylic Resin 4-2 | Acrylic Resin 4-3 | Inert Particles 4-1 | Wax 4-1 | Wetting Agent 4-1 |
| Coating Solution 4-1 | 65 | — | 30 | — | — | — | — | 5 |
| Coating Solution 4-2 | — | 65 | 30 | — | — | — | — | 5 |
| Coating Solution 4-3 | 60 | — | 30 | — | — | 5 | — | 5 |
| Coating Solution 4-4 | 55 | — | 30 | — | — | 5 | 5 | 5 |
| Coating Solution 4-5 | 65 | — | — | 30 | — | — | — | 5 |
| Coating Solution 4-6 | 65 | — | — | — | 30 | — | — | 5 |

Polyester Resin 4-1: Acid components comprise 65 mol % of 2,6-naphthalenedicarboxylic acid, 30 mol % of isophthalic acid and 5 mol % of 5-sodium sulfoisophthalic acid, and glycol components comprise 90 mol % of ethylene glycol and 10 mol % of diethylene glycol (Tg=80° C., average molecular weight: 13,000).

The polyester resin 4-1 was produced in the following method in accordance with a method described in Example 1 of JP-A 6-116487. That is, 44 parts of dimethyl 2,6-naphthalenedicarboxylate, 16 parts of dimethyl isophthalate, 4 parts of dimethyl 5-sodium sulfoisophthalate, 34 parts of ethylene glycol and 2 parts of diethylene glycol were charged into a reactor, 0.05 parts of tetrabutoxytitanium were added thereto, and the resulting mixture was heated under a nitrogen atmosphere with a temperature controlled to 230° C. so as to distill out methanol produced, thereby carrying out an ester interchange reaction. Then, the temperature of the reaction system was gradually increased to 255° C. and an internal pressure of the system was reduced to 1 mmHg to carry out a polycondensation reaction. Thus, the polyester resin 4-1 was obtained.

Polyester Resin 5-2: Acid components comprise 60 mol % of terephthalic acid, 35 mol % of isophthalic acid and 5 mol % of 5-sodium sulfoisophthalic acid, and glycol components comprise 90 mol % of ethylene glycol and 10 mol % of diethylene glycol (Tg=45° C., average molecular weight: 14,000).

The polyester resin 4-2 was produced in the following method in accordance with the method described in Example 1 of JP-A 6-116487. That is, 36 parts of dimethyl terephthalate, 21 parts of dimethyl isophthalate, 5 parts of dimethyl 5-sodium sulfoisophthalate, 36 parts of ethylene glycol and 2 parts of diethylene glycol were charged into a reactor, 0.05 parts of tetrabutoxytitanium were added thereto, and the resulting mixture was heated under a nitrogen atmosphere with a temperature controlled to 230° C. so as to distill out methanol produced, thereby carrying out an ester interchange reaction. Then, the temperature of the reaction system was gradually increased to 255° C. and an internal pressure of the system was reduced to 1 mmHg to tion Examples 1 to 3 of JP-A 63-37167. That is, 3 parts of sodium lauryl sulfonate as a surfactant and 181 parts of ion exchanged water were charged into a four neck flask and heated to 60° C. in a current of nitrogen. Then, 0.5 parts of ammonium persulfate and 0.2 parts of sodium hydrogen nitrite were added thereto as polymerization initiators, and a mixture of 23.3 parts of methyl methacrylate, 22.6 parts of 2-isopropenyl-2-oxazoline, 40.7 parts of polyethylene oxide (n=10) methacrylate and 13.3 parts of acrylamide which were monomers was added dropwise over 3 hours while a temperature of the solution constantly adjusted to 60 to 70° C. Even after completion of the dropwise addition, the resulting solution was kept in the above temperature range for 2 hours and allowed to continue to react under agitation. Then, the resulting solution was cooled, thereby obtaining an aqueous dispersion of the acrylic resin 4-1 with a solid content of 35%.

Acrylic Resin 4-2: This resin comprises 30 mol % of methyl methacrylate, 40 mol % of 2-isopropenyl-2-oxazoline and 30 mol % of acrylamide (Tg=80° C.).

To obtain the acrylic resin 4-2, polymerization was carried out in the same manner as in the case of the acrylic resin 4-1 except that 34.9 parts of methyl methacrylate, 45.2 parts of 2-isopropenyl-2-oxazoline and 19.9 parts of acrylamide were charged, so as to obtain an aqueous dispersion of the acrylic resin.

Acrylic Resin 4-3: This resin comprises 45 mol % of methyl methacrylate, 45 mol % of butyl acrylate, 5 mol % of glycidyl methacrylate and 5 mol % of 2-hydroxyethyl methacrylate (Tg=50° C.).

To obtain the acrylic resin 4-3, polymerization was carried out in the same manner as in the case of the acrylic resin 5-1 except that 38.7 parts of methyl methacrylate, 49.6 parts of butyl acrylate, 6.1 parts of glycidyl methacrylate and 5.6 parts of 2-hydroxyethyl methacrylate were charged, so as to obtain an aqueous dispersion of the acrylic resin.

Inert Particles 4-1: Silica filler (average particle diameter: 100 nm) (product of Nissan Chemical Industries, Ltd., trade name: SELOSOL ZL)

Wax 4-1: Carnauba wax (product of Chukyo Yushi Co., Ltd., trade name: SELOSOL 524)

Wetting Agent 4-1: Polyoxyethylene (n=7) lauryl ether (product of Sanyo Chemical Industries, Ltd., trade name: NAROACTY N-70)

Then, these coated films were dried at 95° C., stretched to 3.7 times in a transverse direction at 120° C., shrunk 3% in the width direction at 220° C. and heat-set so as to obtain easily adhesive films each having a thickness of 188 μm. The thickness of the coating film was 0.15 μm.

Example 4-5

A mol %en polyethylene-2,6-naphthalate (intrinsic viscosity=0.65 dl/g, Tg=121° C.) was extruded from a die and cooled on a cooling drum in accordance with a conventional method so as to obtain an unstretched film. Then, the unstretched film was stretched to 3.6 times in a longitudinal direction, and an 8% aqueous coating solution of a composition for a coating film (the coating solution 4-1 in Table 7) was uniformly coated on both surfaces of the stretched film by means of a roll coater. Then, the coated film was dried at 105° C., stretched to 3.8 times in a transverse direction at 140° C., shrunk 3% in the width direction at 230° C. and heat-set so as to obtain an easily adhesive film having a thickness of 188 μm. The thickness of the coating film was 0.15 μm.

coefficient of friction and blocking resistance are ○ and none of the evaluation results are Δ or X (overall evaluation: good).

Δ: Surface roughness (Ra) is within 0.002 to 0.01 μm, adhesion to a hard coat and adhesion to an adhesive are both 3 or larger, and some of results of evaluations of haze, a coefficient of friction and blocking resistance are Δ and none of the evaluation results are X (overall evaluation: somewhat good).

X: Surface roughness (Ra) is out of 0.002 to 0.01 μm, either or both of adhesion to a hard coat and adhesion to an adhesive are 2 or smaller or at least one of results of evaluations of haze, a coefficient of friction and blocking resistance are is X (overall evaluation: bad).

Example 5-1

A mol %en polyethylene terephthalate (intrinsic viscosity=0.65 dl/g, glass transition point: 78° C.) containing 0.007 wt % of porous silica having an average particle diameter of 1.7 μm was extruded from a die and cooled on a cooling drum in accordance with a conventional method so as to obtain an unstretched film. Then, the unstretched film was stretched to 3.2 times in a longitudinal direction, and an 8% aqueous coating solution of a composition for a coating film (the coating solution 4—4 in Table 7) was uniformly coated on both surfaces of the stretched film by means of a roll coater.

TABLE 8

| | | | Surface | | Adhesion | | | |
| --- | --- | --- | --- | --- | --- | --- | --- | --- |
| | Coating Agent | Haze | Roughness (Ra) (μm) | Slipperiness | Hard Coat | Adhesive (PSA) | Blocking Resistance | Overall Evaluation |
| Ex. 4-1 | Coating Solution 4-1 | ⊚ | 0.006 | ○ | 5 | 5 | ⊚ | ○ |
| Ex. 4-2 | Coating Solution 4-2 | ⊚ | 0.006 | ○ | 5 | 5 | ⊚ | ○ |
| Ex. 4-3 | Coating Solution 4-3 | ⊚ | 0.007 | ⊚ | 5 | 5 | ⊚ | ⊚ |
| Ex. 4-4 | Coating Solution 4-4 | ⊚ | 0.007 | ⊚ | 5 | 5 | ⊚ | ⊚ |
| Ex. 4-5 | Coating Solution 4-1 | ⊚ | 0.007 | ○ | 5 | 5 | ⊚ | ○ |
| C. Ex. 4-1 | Coating Solution 4-5 | X | 0.010 | X | 5 | 2 | ○ | X |
| C. Ex. 4-2 | Coating Solution 4-6 | X | 0.011 | X | 5 | 2 | ○ | X |

Ex.: Example,
C. Ex.: Comparative Example

As is obvious from the results shown in Table 8, the easily adhesive polyester films for optical use of the present invention were excellent in adhesion, transparency and easy slipperiness. The films of the present invention are useful for a variety of optical applications, particularly as a base film for a prism lens sheet, a touch panel, a backlight or the like, a base film for an antireflective film and an explosion-proof base film for a display.

The overall evaluations shown in Table 8 were made based on the following criteria.

⊚: Surface roughness (Ra) is 0.002 to 0.01 μm, adhesion to a hard coat and adhesion to an adhesive are both 3 or larger, and results of evaluations of haze, a coefficient of friction and blocking resistance are all ⊚ (overall evaluation: very good).

○: Surface roughness (Ra) is 0.002 to 0.01 μm, adhesion to a hard coat and adhesion to an adhesive are both 3 or larger, and some of results of evaluations of haze, a Then, the coated film was stretched to 3.6 times in a transverse direction at 120° C. while dried at 95° C. and then heat-set at 220° C. so as to obtain an adhesive film for optical use which had a thickness of 125 μm. The thickness of the coating film was 90 nm, and center line surface roughness (Ra) of the surface of the coating film was 8 nm. The results of evaluations of universal hardness (UHF), haze value, coefficient of friction, adhesion to an adhesive and adhesion to a hard coat of the surface of the coating film of the obtained film are shown in Table 9.

Then, on one of the adhesive coating films on the film, an ultraviolet curable composition having the following composition was uniformly coated by use of a roll coater such that the coated composition would have a thickness of 5 μm after cured.

(Ultraviolet Curable Composition)

| pentaerythritol acrylate: | 45 wt % |
| --- | --- |
| N-methylolacrylamide: | 40 wt % |
| N-vinyl pyrrolidone: | 10 wt % |
| 1-hydroxycyclohexylphenyl ketone | 5 wt % |

Then, the coated composition was exposed to an ultraviolet radiation irradiated by a high-pressure mercury-vapor lamp having an intensity of 80 W/cm for 30 seconds so as to be cured, thereby obtaining a hard coat layer. The results of evaluations of abrasion resistance, falling ball impact test, universal hardness (UC) and compatibility with the following expression (1) of the hard coat layer are shown in Table 9.

$$0.6 \times UC \leq UHF \leq 1.2 \times UC \quad (1)$$

On the hard coat layer, a low refractive index layer ($SiO_2$, 30 nm), a high refractive index layer ($TiO_2$, 30 nm), a low refractive index layer ($SiO_2$, 30 nm), a high refractive index layer ($TiO_2$, 100 nm) and a low refractive index layer ($SiO_2$, 100 nm) were formed in this order by sputtering, thereby obtaining a laminate for optical use.

Example 5-2

A mol %en polyethylene-2,6-naphthalate (intrinsic viscosity: 0.65 dl/g, Tg=121° C.) containing 0.007 wt % of porous silica having an average particle diameter of 1.7 μm was extruded from a die and cooled on a cooling drum in accordance with a conventional method so as to obtain an unstretched film. Then, the unstretched film was stretched to 3.6 times in a longitudinal direction, and an 8% aqueous coating solution of a composition for a coating film (the coating solution 4—4 in Table 7) was uniformly coated on both surfaces of the stretched film by means of a roll coater. Then, the coated film was stretched to 3.8 times in a transverse direction at 140° C. while dried at 105° C. and then heat-set at 230° C. so as to obtain an adhesive film for optical use which had a thickness of 125 μm. The thickness of the coating film was 90 nm, and center line surface roughness (Ra) of the surface of the coating film was 8 nm. The results of evaluations of universal hardness (UHF), haze value, coefficient of friction, adhesion to an adhesive and adhesion to a hard coat of the surface of the coating film of the obtained film are shown in Table 9.

Example 5-3

An adhesive film for optical use was obtained in the same process as in Example 5-1 except that a mol %en polyethylene terephthalate/isophthalate copolymer (proportion of copolymerized isophthalic acid component 6 mol %, intrinsic viscosity=0.65 dl/g, glass transition point=78° C.) containing 0.007 wt % of porous silica having an average particle diameter of 1.7 μm was extruded from a die and cooled on a cooling drum in accordance with a conventional method so as to obtain an unstretched film. The thickness of the coating film on the film was 90 nm, and center line surface roughness (Ra) of the surface of the coating film was 8 nm. The results of evaluations of universal hardness (UHF), haze value, coefficient of friction, adhesion to an adhesive and adhesion to a hard coat of the surface of the coating film of the obtained film are shown in Table 9.

As is obvious from the results shown in Table 9, the films for optical use of the present invention were excellent in transparency and adhesion to a hard coat, and laminates for optical use obtained by forming hard coat layers on the films by coating were excellent in crack resistance of the hard coat layers and exhibited good abrasion resistance and antireflectivity.

TABLE 9

| | | Universal Hardness | | | | | Adhesion | | Hard Coat Layer | |
| --- | --- | --- | --- | --- | --- | --- | --- | --- | --- | --- |
| | Coating | UHF | UC | Expression (1) | | Coefficient of | | | Abrasion | Falling Ball |
| Polyester | Agent | gr | gr | Compatibility | Haze | Friction (μs) | Adhesive | Hard Coat | Resistance | Impact Test |
| Ex. 5-1 PET | Coating Solution 4-4 | 20 | 20 | ○ | ⊚ | 0.35 | ○ | ○ | ○ | ○ |
| Ex. 5-2 PEN | Coating Solution 4-4 | 23 | 20 | ○ | ⊚ | 0.35 | ○ | ○ | ○ | ○ |
| Ex. 5-3 PET/IA6 | Coating Solution 4-4 | 18 | 20 | ○ | ⊚ | 0.35 | ○ | ○ | ○ | ○ |

Ex.: Example
Symbols in the column of "Expression (1) Compatibility" of Universal Hardness in Table 9 represent the following.
○: An UHF value is within the range defined by the above expression (1).
X: An UHF value is out of the range defined by the above expression (1).

What is claimed is:

1. A biaxially oriented laminated polyester film comprising:
   (A) an aromatic polyester film, and
   (B) a coating layer containing a polyester resin, an acrylic resin and wax, said coating layer being laminated on at least one surface of the aromatic polyester film, wherein the polyester resin has a glass transition temperature of 50 to 100° C., and wherein the acrylic resin has an oxazoline group and an alkylene oxide chain.

2. The film of claim 1, wherein the acrylic resin has a glass transition temperature of −50 to +50° C.

3. The film of claim 1, wherein the acrylic resin is soluble or dispersible in water.

4. The film of claim 1, wherein the wax is at least one wax selected from the group consisting of a carnauba wax, a paraffin wax and a polyethylene wax.

5. The film of claim 1, wherein the coating layer (B) contains the polyester resin in an amount of 50 to 95 wt %, the acrylic resin in an amount of 5 to 30 wt %, and the wax in an amount of not larger than 20 wt %, based on a total weight of the polyester resin, acrylic resin and wax.

6. The film of claim 1, wherein the coating layer (B) also contains inert particles in an amount of not larger than 10 wt % based on the total weight of the polyester resin, acrylic resin and wax.

7. The film of claim 1, wherein a surface of the coating layer (B) has a center line surface roughness (Ra) of 0.002 to 0.01 μm.

8. The film of claim 1, wherein the surface of the coating layer (B) has a coefficient of static friction (μs) of not larger than 0.8.

9. The film of claim 1, wherein the surface of the coating layer (B) has no optical defects having a vertical interval of not smaller than 0.5 μm and a maximum diameter of not smaller than 0.5 μm.

10. The film of claim 1, wherein the aromatic polyester film (A) is a polyethylene terephthalate film or polyethylene-2,6-naphthalene dicarboxylate.

11. The film of claim 1, which has a haze value of not higher than 1%.

12. The film of claim 1, which is used in a light transmission layer of a display.

13. A hard coat laminated film comprising the biaxially oriented laminated polyester film of claim 1 and a hard coat layer laminated on the coating layer (B) of the film, the hard coat layer having a universal hardness (UC) which satisfies the following relational expression:

$$0.6 \times UC \leq UHF \leq 1.2 \times UC$$

wherein UC is the universal hardness of the hard coat layer, and UHF is the universal hardness measured from the coating layer (B) side of the biaxially oriented laminated polyester film.

14. The film of claim 13, wherein the hard coat layer comprises a cured resin which is a radiation curable resin cured by irradiation of radiation.

15. The film of claim 13, which is used in a light transmission layer of a display.

16. A biaxially oriented laminated polyester film comprising:

(A) an aromatic polyester film, and (B) a coating layer containing a polyester resin and an acrylic resin having an oxazoline group and an alkylene oxide chain, said coating layer being laminated on at least one surface of the aromatic polyester film.

17. The film of claim 16, wherein the coating layer (B) contains the polyester resin in an amount of 5.3 to 94.7 wt % and the acrylic resin in an amount of 5.3 to 94.7 wt % based on a total weight of the polyester resin and the acrylic resin.

18. The film of claim 16, wherein the coating layer (B) also contains inert particles in an amount of not larger than 20 wt % based on the total weight of the polyester resin and the acrylic resin.

19. The film of claim 16, wherein a surface of the coating layer (B) has a center line surface roughness (Ra) of 0.002 to 0.01 μm.

20. The film of claim 16, which has a haze value of not higher than 1%.

21. The film of claim 16, which is used in a light transmission layer of a display.

22. A hard coat laminated film comprising the biaxially oriented laminated polyester film of claim 14 and a hard coat layer laminated on the coating layer (B) of the film, the hard coat layer having a universal hardness (UC) which satisfies the following relational expression:

$$0.6 \times UC \leq UHF \leq 1.2 \times UC$$

wherein UC is the universal hardness of the hard coat layer, and UHF is the universal hardness measured from the coating layer (B) side of the biaxially oriented laminated polyester film.

23. The film of claim 22, wherein the hard coat layer comprises a cured resin which is a radiation curable resin cured by irradiation of radiation.

24. The film of claim 22, which is used in a light transmission layer of a display.

* * * * *